US012705314B2

(12) United States Patent
Kaplan et al.

(10) Patent No.: US 12,705,314 B2
(45) Date of Patent: Aug. 11, 2026

(54) USING OWNERSHIP IDENTIFIERS IN METADATA IN A MEMORY FOR PROTECTING ENCRYPTED DATA STORED IN THE MEMORY

(71) Applicant: Advanced Micro Devices, Inc., Santa Clara, CA (US)

(72) Inventors: David Kaplan, Austin, TX (US); Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 317 days.

(21) Appl. No.: 18/081,540

(22) Filed: Dec. 14, 2022

(65) Prior Publication Data

US 2024/0202289 A1 Jun. 20, 2024

(51) Int. Cl.
*H04L 9/08* (2006.01)
*G06F 9/455* (2018.01)
*G06F 21/10* (2013.01)
*H04L 9/32* (2006.01)

(52) U.S. Cl.
CPC ...... *G06F 21/1066* (2023.08); *G06F 9/45558* (2013.01); *G06F 2009/45587* (2013.01)

(58) Field of Classification Search
CPC ............. G06F 21/1066; G06F 9/45558; G06F 2009/45587; G06F 2009/45583
See application file for complete search history.

(56) References Cited

U.S. PATENT DOCUMENTS

| | | | | |
|---|---|---|---|---|
| 9,934,407 B2 * | 4/2018 | Sikka | G06F 21/6218 | |
| 2014/0156960 A1 * | 6/2014 | Simoncelli | G06F 21/604 | 711/163 |
| 2016/0072796 A1 * | 3/2016 | Adam | H04L 63/0853 | 713/159 |
| 2019/0004843 A1 * | 1/2019 | Durham | G06F 21/53 | |
| 2019/0034633 A1 * | 1/2019 | Seetharamaiah | G06F 9/45558 | |
| 2020/0257827 A1 * | 8/2020 | Kounavis | H04L 9/0637 | |
| 2021/0406054 A1 * | 12/2021 | Tsirkin | G06F 21/78 | |
| 2023/0027329 A1 * | 1/2023 | Durham | G06F 21/602 | |
| 2023/0084922 A1 * | 3/2023 | Ichikawa | G06F 21/79 | 711/163 |
| 2023/0342169 A1 * | 10/2023 | Tsirkin | G06F 9/45558 | |
| 2023/0401081 A1 * | 12/2023 | Lin | G06F 9/45558 | |

* cited by examiner

*Primary Examiner* — Hany S. Gadalla
(74) *Attorney, Agent, or Firm* — FIG. 1 Patents

(57) ABSTRACT

An electronic device includes a memory and controller circuitry. The controller circuitry, responsive to a read request to read encrypted data stored in the memory, acquires, from metadata stored with the encrypted data in the memory, an ownership identifier identifying a type of writing entity that stored the encrypted data in the memory. The controller circuitry uses the ownership identifier to control whether, when responding to the read request, data decrypted from the encrypted data is returned or substitute data is returned instead of data decrypted from the encrypted data.

20 Claims, 7 Drawing Sheets

USING OWNERSHIP IDENTIFIERS IN METADATA IN A MEMORY FOR PROTECTING ENCRYPTED DATA STORED IN THE MEMORY

BACKGROUND

Related Art

Some electronic devices (e.g., server computers, desktop computers, etc.) execute virtual machines. Virtual machines are software entities that act as interfaces between hardware elements of the electronic devices (e.g., processors, memories, network interfaces, etc.) and software programs that execute on/using the virtual machine. For example, a virtual machine can provide support for executing one or more instances of an operating system. An operating system instance can in turn provide support for executing other software programs such as applications, databases, etc. Some of the electronic devices execute two or more virtual machines concurrently. The electronic devices also execute a hypervisor, which is a software entity that functions as a manager or controller for virtual machines. For example, a hypervisor may start or initialize virtual machines, control accesses of electronic device hardware by virtual machines, terminate or close virtual machines, etc.

In many cases, virtual machines and the software programs executing thereon store data in a memory of the electronic device that should not be exposed to malicious entities (i.e., hackers, snoops, etc.). Malicious entities may use various hardware or software attacks to access a virtual machine's data in memory, such as causing a software entity such as another virtual machine, the hypervisor, etc. to read the data from the memory or directly reading the data from memory circuitry (e.g., removing a memory chip/card from the system for external analysis, etc.). In order to avoid a malicious entity accessing a virtual machine's data in the memory, designers have proposed encrypting data in the memory.

BRIEF DESCRIPTION OF THE FIGURES

Throughout the figures and the description, like reference numerals refer to the same figure elements.

DETAILED DESCRIPTION

Figure 1:
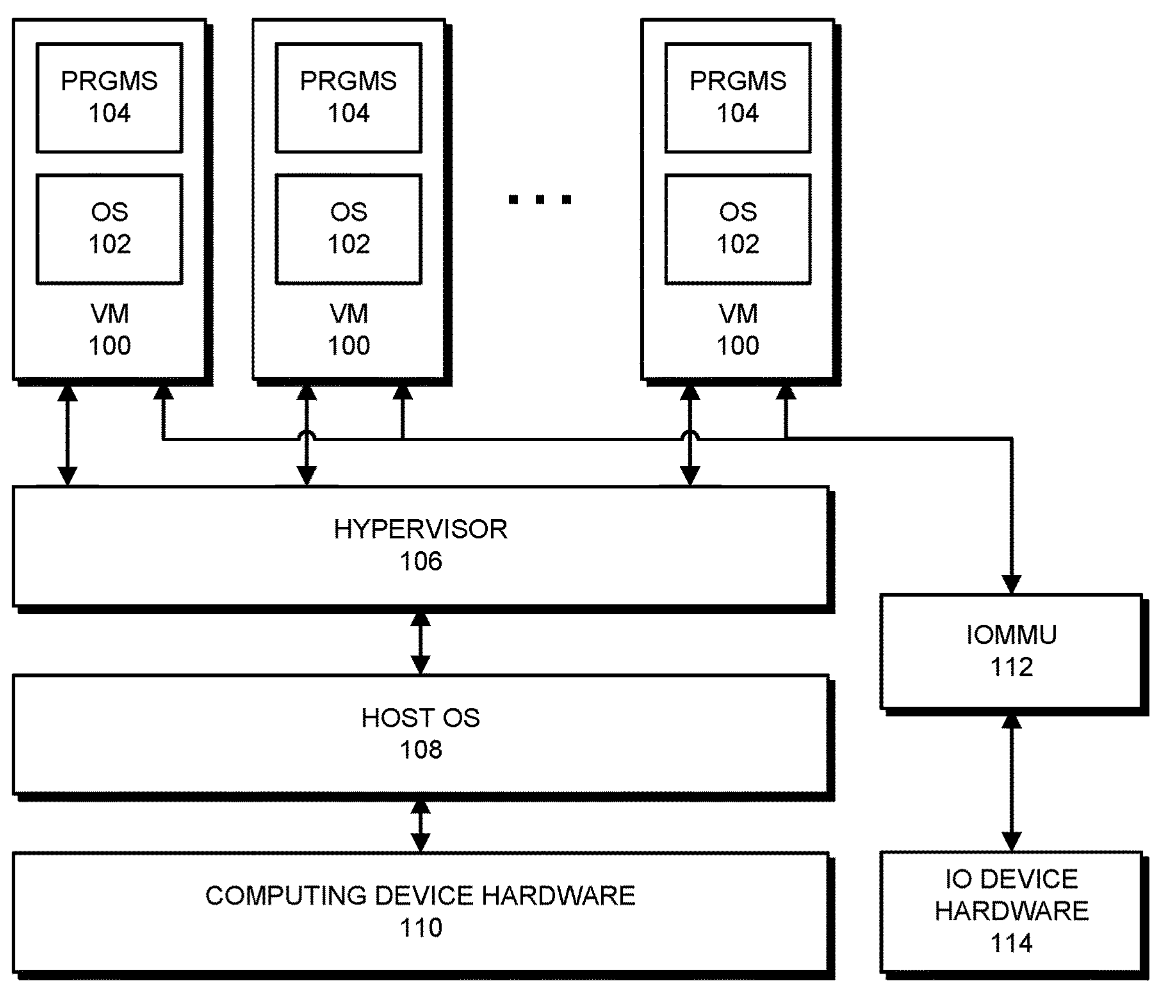
FIG. 1 presents a block diagram illustrating virtual machines and a hypervisor in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or part thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Virtual Machines, Guests, and Hypervisors

In the described embodiments, a processor in an electronic device executes virtual machines and a hypervisor. In other words, the processor in the electronic device executes software program code for the virtual machines and the hypervisor that causes the electronic device to perform operations of the virtual machines and the hypervisor. Virtual machines are software entities that serve as interfaces between hardware elements of the electronic devices (e.g., processors, memories, etc.) and software programs that execute on/in the virtual machines. For example, a virtual machine can provide support for executing one or more instances of an operating system. Each operating system instance can in turn provide support for executing other software programs such as applications, databases, etc. The hypervisor is a software entity that functions as a manager or controller of and for virtual machines. For example, a hypervisor can start or initialize virtual machines, assist with and/or control accesses of electronic device hardware by virtual machines, terminate or close virtual machines, etc. For the purposes of this description, the hypervisor is interchangeably called a "host" and each virtual machine is interchangeably called a "guest."

FIG. 1 presents a block diagram illustrating virtual machines and a hypervisor in accordance with some embodiments. As can be seen in FIG. 1, there are three virtual machines (VM) 100, each of which executes an operating system (OS) 102 and one or more programs (PRGRMS) 104, such as databases, applications, etc. The virtual machines 100 communicate with a hypervisor 106, which interfaces between a host operating system (HOST OS) 108 and the virtual machines 100. Host operating system 108 provides an interface between electronic device hardware 110 and hypervisor 106. In addition, in some embodiments, an input-output memory management unit (IOMMU) 112 (a hardware entity) interfaces between input-output (IO) device hardware 114 and the virtual machines 100, such as for direct mapped IO devices. Although various elements are presented in FIG. 1, in some embodiments, different arrangements of elements are present. For example, in some embodiments, host operating system 108 is not present and hypervisor 106 communicates more directly with electronic device hardware 110. As another example, IOMMU 112 may interact with hypervisor 106 for at least some operations.

Regions of Memory and Encryption of Data in Regions of Memory

In the described embodiments, an electronic device can execute two or more virtual machines concurrently. For example, the electronic device can execute two or more virtual machines in corresponding time slices, substantially in parallel on one or more processor cores, etc. Each of the virtual machines is associated with a region of a memory in the electronic device for the use of that virtual machine. For example, a region can include or consist of a set of M KiB contiguous or non-contiguous pages of memory that are loaded by a given virtual machine from a mass storage device into the memory or newly created in the memory (for example, M=4, 8, or another number). As another example, a given virtual machine can be allocated an N GiB region of memory, so that memory locations at N GiB worth of memory addresses are reserved for storing pages of memory for the use of the given virtual machine (for example, N=2, 10, or another number). In some embodiments, the hypervisor can similarly be associated with region(s) of memory in which hypervisor data is stored.

Figure 2:
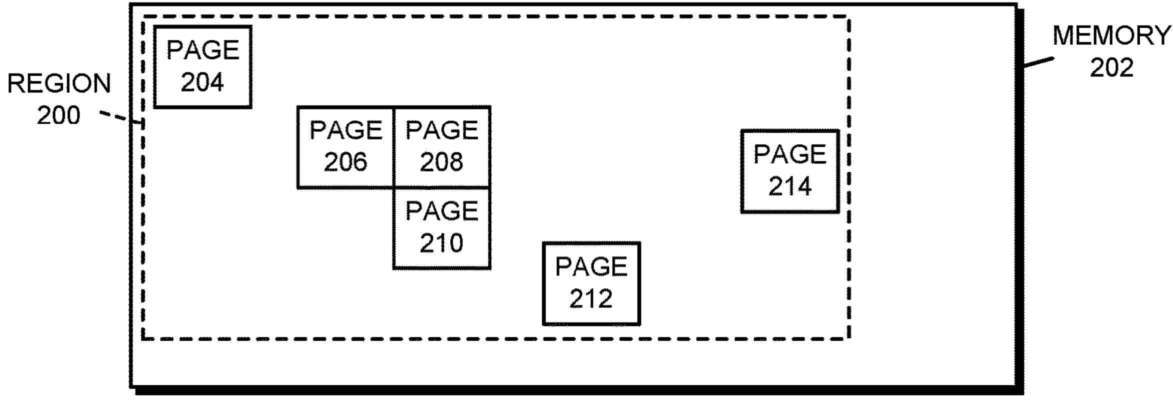
FIG. 2 presents a block diagram illustrating a region of memory for a virtual machine in accordance with some embodiments.

FIG. 2 presents a block diagram illustrating a region of memory (REGION) 200 for a virtual machine in accordance with some embodiments. For the example in FIG. 2, region 200 includes set of M KiB pages of memory that are loaded by the virtual machine from a mass storage device (e.g., mass storage 306 in FIG. 3) into memory 202 or newly created in memory 202 (for example, M=4, 8, or another number). Although a particular number and arrangement of elements is shown in FIG. 2, in some embodiments, the elements are different and/or arranged differently. As can be seen in FIG. 2, memory 202 includes region 200, includes—and is defined by—six pages of memory, pages 204-214. Each of pages 204-214 is an M KiB block of data that was copied from a mass storage device into the memory or newly generated in the memory. Pages are stored at locations in memory in accordance with various factors, such as an address of the page in the memory, a virtual machine that stored the page in the memory, etc., as shown by the scattered placement of pages 204-214 in FIG. 2.

In the described embodiments, data stored in the region of memory associated with given virtual machine can be private. A given virtual machine's private data is "private" in that the data is intended to be protected from accesses by other virtual machines and the hypervisor (and likely other entities in the electronic device). For example, the given virtual machine (or another entity, such as an operating system executing on the given virtual machine, etc.) may set some or all pages of memory loaded by the given virtual machine into the memory as private to prevent undesired accesses of secure data in the pages of memory. Other virtual machines are prevented from impermissibly accessing private data in a region of memory associated with the given virtual machine and vice versa. Other data stored in the region of memory associated with the given virtual machine can be "public" data that can be accessible to other virtual machines and the hypervisor.

Because data in the memory, including in embodiments in which the memory is implemented using non-volatile memory circuitry, is susceptible to external attacks (e.g., by reading the data directly from the memory circuitry, removing a memory chip/card from the system for external analysis, etc.), the described embodiments can encrypt data in regions of memory for the virtual machines and the hypervisor. The encryption of the data is performed at a "hardware" level and therefore the electronic device includes encryption circuitry that encrypts data in the regions of memory. For example, a memory controller, platform security processor, and/or another functional block in the electronic device can include encryption circuitry, or a portion thereof, that performs operations associated with encrypting data in the regions of memory. In some embodiments, each virtual machine is associated with encryption keys that are used by the encryption circuitry for encrypting data in the respective region of memory. For example, in some embodiments, a given virtual machine is associated with a first encryption key that is used for encrypting the virtual machine's private data and a second encryption key that is used for encrypting the virtual machine's public data. In these embodiments, other virtual machines and/or the hypervisor can also be associated with the second encryption key (or an equivalent encryption key) to enable the other virtual machines and/or the hypervisor to decrypt the given virtual machine's public data. In addition, the hypervisor is associated with its own encryption keys that are used by the encryption circuitry for encrypting data in the respective region of memory.

In some embodiments, the electronic device supports storing unencrypted data in memory. For example, in some embodiments, all data in a region of memory for a legacy virtual machine (as described below) that does not support the encryption of data in memory may not be encrypted in memory. As another example, in some embodiments, a virtual machine or the hypervisor (or another entity) can mark data (e.g., a page of memory) as unencrypted and the electronic device will not encrypt the data—but may otherwise encrypt data stored in other pages of memory for the virtual machine and/or hypervisor.

Note that, without the protections described herein, although data is encrypted in the memory, a malicious entity can use encrypted data to determine information about virtual machines. For example, the malicious entity can cause the hypervisor and/or another software entity, via malicious program code, sequences of operations, etc., to read and return encrypted data before and after a given virtual machine performs one or more operations to determine if, when, and how the encrypted data changes. Using this technique, although the malicious entity may be unable to decrypt the data, and thus will not be able to access the decrypted/plaintext data itself, the malicious entity can determine valuable information about operations of the virtual machine and/or the virtual machine's data based on changes—or lack thereof—in the data.

Supporting Virtual Machines and Legacy Virtual Machines

In the described embodiments, an electronic device can execute virtual machines that do not support some or all features of one or more feature sets provided by the electronic device (i.e., provided by functional blocks thereon, such as a processor, a security processor, a memory controller, etc.). For example, a virtual machine may not support the returning of substitute data in response to read requests (a feature) as described herein, may not support the encryption of data in the memory (another feature), etc. Virtual machines and/or the electronic device may operate unexpectedly or crash, cause errors by/for other entities, or operate inefficiently when a virtual machine is forced to operate with unsupported features. For the purposes of this description, virtual machines that do not support a particular feature or feature set are called "legacy" virtual machines. In contrast, "supporting" virtual machines support a particular feature or feature set.

In some embodiments, it is not the virtual machine alone that should support a feature or feature set in order to be a supporting virtual machine. For example, in some embodiments, an operating system operating on the virtual machine should also support the feature or feature set in order for the virtual machine to be a supporting virtual machine. In other words, for certain features and/or feature sets, the operating system executing on/in a virtual machine should also support the certain features and/or feature sets, or else the virtual machine will be considered a legacy virtual machine as described herein.

Additional Data Protections

Throughout this description, operations are performed based on, using, and associated with encrypted data for entities in an electronic device. That is, operations are performed in an electronic device in which data for virtual machines and hypervisors can be encrypted in order to protect the data from malicious or erroneous accesses. In some embodiments, however, one or more additional protection schemes are used for protecting data in the memory. For example, in some embodiments, a secure access record, sometimes called a "mapping record," is kept by hardware and/or software entities in the electronic device. The access record includes information about entities (e.g., virtual machines, the hypervisor, and/or other entities) that have accessed data in memory. For example, the access record may include information about the entity that stored a block of memory (e.g., an N KiB page of memory) into the memory to which the block of memory belongs, as well as other information about the page of memory (e.g., public or private, encrypted or plaintext, etc.). The electronic device can check the access record to determine if a requesting entity, such as a virtual machine, is recorded as having previously accessed data in memory and/or is recorded as being permitted to access data in the memory—and thus is to be allowed to access the data in memory (or not). The access record is "secure" in that the record is protected via hardware and/or software protection mechanisms from being changed impermissibly and possibly maliciously. The information in the access record is therefore assumed to be free from tampering and trustworthy.

In some embodiments, the above-described access record is only checked for supporting virtual machines. In other words, each request to access memory includes, or is associated with, information indicating whether the requesting entity is a supporting virtual machine (i.e., that supports the use of the access record and associated operations). When a request is received from a supporting virtual machine, the electronic device performs the above-described check of the access record—and can prevent the requesting supporting virtual machine from accessing private data that is identified as belonging to a different supporting virtual machine. In this way, accesses of data in memory can be prevented for supporting virtual machines based on information in the access record. This means that the return of substitute data as described herein does not occur for supporting virtual machines in these embodiments because the accesses are blocked without returning data. Because checking the access record incurs a performance penalty (and possibly for other reasons), however, the access record is not checked in some embodiments for other entities—including legacy virtual machines and the hypervisor. When a legacy virtual machine or the hypervisor requests to access data in memory, the substitute data can be returned as described herein.

Overview

In the described embodiments, an electronic device includes a processor that executes one or more virtual machines and a hypervisor. The electronic device also includes a memory that is used for storing data for the one or more virtual machines and the hypervisor. As described above, each virtual machine is associated with a respective region of memory and the hypervisor is associated with its own region of memory. Each of the regions of memory is used for storing data for the associated virtual machine or the hypervisor. Data stored in the regions of memory is encrypted (it is assumed that the data is encrypted, although some of the data can be unencrypted in some embodiments). More specifically, data stored in each virtual machine's region of memory is encrypted using encryption keys associated with that virtual machine and data stored in the hypervisor's region of memory is encrypted using encryption keys associated with the hypervisor.

In addition to the processor and the memory, the electronic device includes controller circuitry (e.g., in a memory controller, platform security processor, etc.) that performs operations for protecting encrypted data stored in regions of memory associated with supporting virtual machines from potentially malicious reads by entities other than supporting virtual machines. The controller circuitry does this by returning substitute data instead of the encrypted data when responding to read requests from the hypervisor or legacy virtual machines to read a supporting virtual machine's encrypted data (where the hypervisor and the legacy virtual machines are "entities other than the supporting virtual machine"). In other words, instead of returning the actual encrypted data, the controller circuitry returns fake/dummy data with a specified pattern of bit values so that the hypervisor or a legacy virtual machine does not gain access to the encrypted data for a supporting virtual machine. The controller circuitry otherwise returns the encrypted data following a decryption operation. For example, the controller circuitry can return the encrypted data following decryption when the hypervisor reads encrypted data for a legacy virtual machine or when a supporting virtual machine reads encrypted data for another supporting virtual machine. Note that, in some embodiments, data for supporting virtual machines is protected from undesired accesses by other supporting virtual machines using the above-described secure access record—and thus such accesses, if the accesses are impermissible, are blocked prior to the return of data.

In some embodiments, when writing/storing encrypted data in the memory for a writing entity (i.e., a virtual machine or the hypervisor), the controller circuitry stores an ownership identifier identifying a type of writing entity in metadata that is stored with the encrypted data in the memory. For this operation, upon receiving a write request to write/store data in the memory, the controller circuitry (or encryption circuitry) encrypts the data using an encryption key associated with the writing entity. In some embodiments, the controller circuitry acquires an encryption key from a table of encryption key-identifier pairs using a writing entity identifier acquired from the write request and a public/private specification for the data. The controller circuitry then processes the data in encryption circuitry using the encryption key to encrypt the data (i.e., encrypt the data using the Advanced Encryption Standard (AES) or another encryption standard). The controller circuitry also generates, based on the writing entity identifier, an ownership identifier that identifies a type of the writing entity from among a set of types of writing entities including: (1) legacy virtual machines, (2) supporting virtual machines, and (3) the hypervisor. The controller circuitry next stores the encrypted data in the memory and stores the ownership identifier in the metadata that is stored with the encrypted data in the memory. In this way, the controller circuitry locally stores the ownership identifier along with the encrypted data. In some embodiments, the controller circuitry stores the encrypted data and the metadata in the memory in a single write operation. Note, however, that multiple write operations in which respective portions of encrypted data and corresponding metadata/ownership identifiers are written to a memory may be used for storing chunks of data larger than a minimum size (e.g., 32 bytes, 48 bytes, or another size).

In some embodiments, when reading encrypted data from the memory, the controller circuitry uses an ownership identifier from metadata stored with the encrypted data in the memory to determine whether the encrypted data or substitute data is returned to a reading entity. For this operation, upon receiving, from a reading entity, a read request to read data in the memory, the controller circuitry reads the encrypted data and the metadata stored along with the encrypted data from the memory. For example, the controller circuitry can send a corresponding read request to the memory to cause the memory to read out and return both the encrypted data and the metadata—possibly in a single read operation. Recall that the metadata includes an ownership identifier that indicates a type of the writing entity that stored the encrypted data in the memory. The controller circuitry then determines, based on a reading entity identifier from the read request and the ownership identifier, whether the encrypted data or the substitute data is returned. In other words, the controller circuitry controls whether, when responding to the read request, data decrypted from the encrypted data is returned or substitute data is returned based on values of the reading entity identifier and the ownership identifier. Generally, the controller circuitry returns the substitute data when the hypervisor or a legacy virtual machine reads encrypted data that was written into the memory by a supporting virtual machine, but otherwise returns the encrypted data. That is, upon encountering the hypervisor or a legacy virtual machine reading encrypted data that was originally stored in the memory by a supporting virtual machine (i.e., that supports the return of the substitute data), the controller circuitry will not return the encrypted data (or, rather, a decrypted version of the encrypted data), but will instead return the substitute data.

In some embodiments, the metadata in which the ownership identifier is stored as described above includes a set of error correction code (ECC) bits. The ECC bits include a set of bits that are included in the memory circuitry for each of a set of locations in the memory circuitry, such as X ECC bits for each Y byte data storage location in the memory circuitry (for example, X=16, 24, or another number and Y=32, 48, or another number). In these embodiments, one or more of the ECC bits are repurposed for storing the ownership identifier. In other words, in these embodiments, instead of storing ECC information in the one or more repurposed ECC bits as in existing systems, the controller circuitry stores the ownership identifier in the repurposed ECC bits.

In some embodiments, the above-described specified pattern for the substitute data is or includes a predetermined arrangement of bit values. For example, the specified pattern can be such that all the bits have a same logical value, such as all logical one or logical zero values. As another example, the specified pattern can be such that the bits have a predetermined mixture of logical one or zero values, such as alternating logical values, a portion of one value and a portion of another value, etc.

By using ownership identifiers to determine whether encrypted data (following a decryption operation) or substitute data is returned to a reading entity, the described embodiments can avoid the possibility that encrypted data from a supporting virtual machine is returned to the hypervisor or a legacy virtual machine. This can help to avoid a malicious entity being able to exploit the hypervisor or a legacy virtual machine to access to supporting virtual machine's data to access and monitor the encrypted data in order to learn valuable information about the operation of supporting virtual machines. By not returning the substitute data for legacy virtual machines as with supporting virtual machines, the described embodiments avoid potential errors and other complications associated with handling the substitute data for/by legacy virtual machines—meaning that both legacy and supporting virtual machines can operate on the electronic device. By storing ownership identifiers in metadata that is stored with encrypted data in a memory, the described embodiments can more efficiently access ownership identifiers (rather than storing the ownership identifiers in a separate location in memory, which introduces significant access overhead associated with memory reads and writes). This generally enables the use of the ownership identifiers, which increases the security for encrypted data the electronic device. By improving these aspects of the operation of the electronic device, the described embodiments improve the overall performance of the electronic device, which can increase user satisfaction with the electronic device.

Electronic Device

Figure 3:
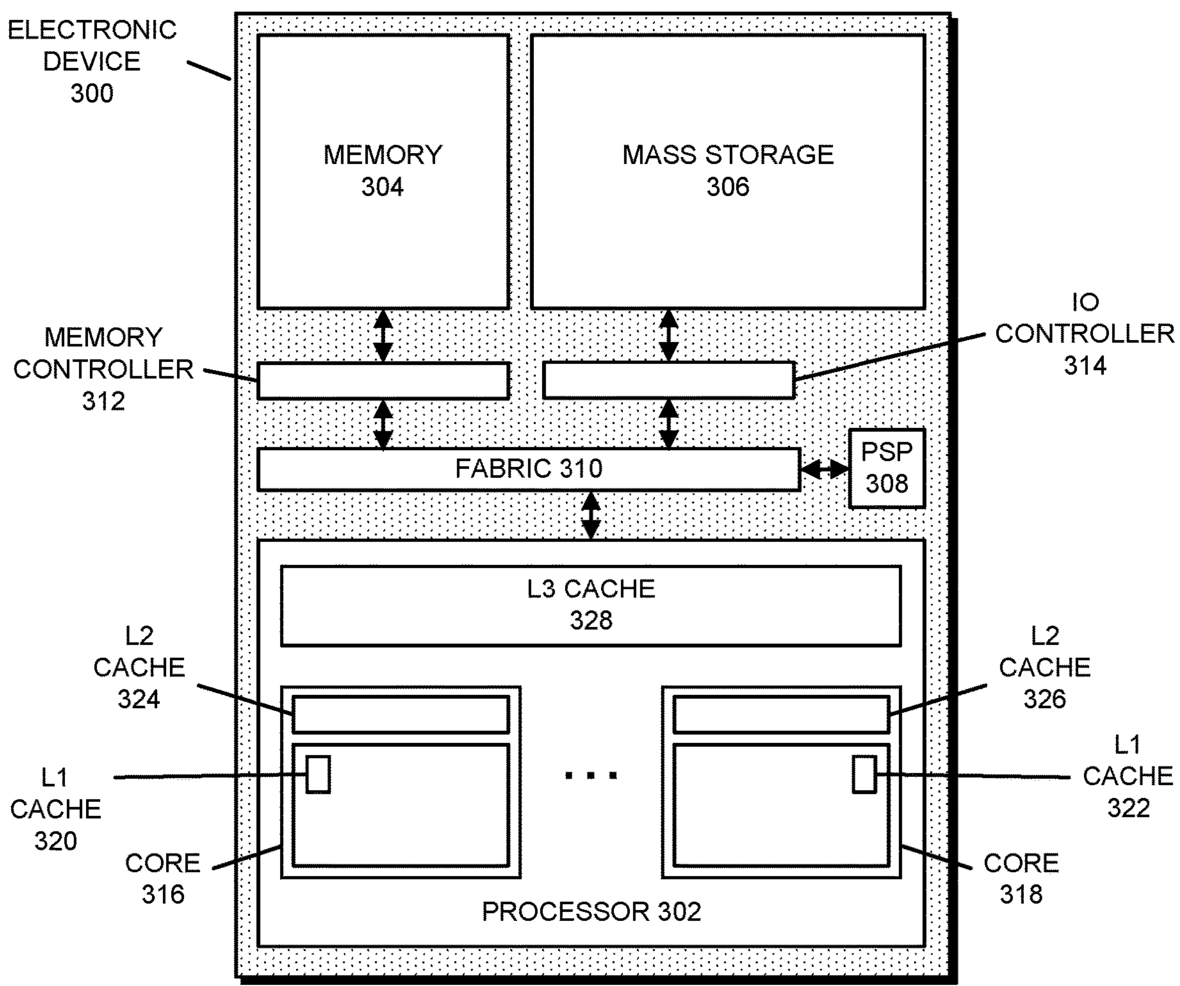
FIG. 3 presents a block diagram illustrating an electronic device in accordance with some embodiments.

FIG. 3 presents a block diagram illustrating an electronic device 300 in accordance with some embodiments. As can be seen in FIG. 3, electronic device 300 includes processor 302, memory 304, mass storage 306, platform security processor (PSP) 308, fabric 310, memory controller 312, and input-output (IO) controller 314. Generally, processor 302, memory 304, mass storage 306, platform security processor 308, fabric 310, memory controller 312, and input-output controller 314 are implemented in hardware, i.e., using corresponding integrated circuitry, discrete circuitry, and/or devices. For example, in some embodiments, processor 302, memory 304, mass storage 306, platform security processor 308, fabric 310, memory controller 312, and input-output controller 314 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some embodiments, processor 302, memory 304, mass storage 306, platform security processor 308, fabric 310, memory controller 312, and input-output controller 314 perform operations for, dependent on, or associated with protecting encrypted data stored in memory 304 as described herein.

Processor 302 is a functional block that performs computational, memory access, control, and/or other operations. For example, processor 302 can be a central processing unit (CPU), a graphics processing unit (GPU), an accelerated processing unit (APU), a system on a chip (SOC), a field programmable gate array (FPGA), etc. Processor 302 includes a number of cores 316-318. Each of cores 316-318 is a separate functional block that performs computational, memory access, control, and/or other operations. For example, in some embodiments, each of cores 316-318 is or includes a central processing unit (CPU) core, a graphics processing unit (GPU) core, an embedded processor, an application specific integrated circuit (ASIC), a microcontroller, and/or another functional block.

Memory 304 is a functional block that stores data for accesses by other functional blocks in electronic device 300. For example, in some embodiments, memory 304 is an integrated circuit memory in which copies of data (e.g., 4 KiB pages of data, etc.) retrieved from mass storage 306 or newly created are stored for subsequent accesses by the other functional blocks (e.g., cores 316-318, etc.). Memory 304 includes memory circuitry such as fifth generation double data rate synchronous dynamic random-access memory (DDR5 SDRAM) and/or other types of memory circuitry, as well as control circuitry for handling accesses of the data stored in the memory circuitry. In some embodiments, memory 304 is what has traditionally been regarded as a "main" memory in electronic device 300.

Mass storage 306 is a functional block, device, and/or element including a non-volatile memory for longer-term storage of data for use by other functional blocks in electronic device 300. For example, mass storage 306 can be or include one or more non-volatile semiconductor memories, hard disks, optical disks, magnetic tapes, etc. As described above, copies of data are retrieved from mass storage 306 and stored in memory 304 or are newly created in memory 304 for access by the other functional blocks.

Returning to processor 302, processor 302 includes cache memories, or "caches," which are functional blocks that are used for storing copies of data that can be used by cores 316-318 (and/or other entities) for performing various operations. For example, the caches can be used to store cache blocks such as M-byte cache lines (or combinations or portions of cache lines) that include copies of data retrieved from memory 304 and/or mass storage 306 or are newly created (for example, M=64, 128, or another number). As can be seen in FIG. 3, the caches include level one caches 320-322 (L1 CACHE 320 and L1 CACHE 322) and level two caches 324-326 (L2 CACHE 324 and L2 CACHE 326) in cores 316-318, respectively. Each of L1 caches 320-322 and L2 caches 324-326 includes memory circuitry for storing cache blocks with copies of data and control circuitry for handling accesses of data stored in the memory circuitry. The caches also include a level three cache 328 (L3 CACHE 328) that includes memory circuitry for storing cache blocks with copies of data and control circuitry for handling accesses of data stored in the memory circuitry. In some embodiments, L3 cache 328 is shared by cores 316-318 and therefore can be used for storing copies of data that can be accessed by both of cores 316-318. In some embodiments, the caches considered a hierarchy, with smaller and faster-access caches higher in the hierarchy. For example, in some embodiments, the highest caches in the hierarchy, L1 caches 320-322, are 128 KiB and are the fastest to access, L2 caches 324-326 are 1024 KiB and are accessed at an intermediate speed, and the lowest cache in the hierarchy, L3 cache 328, is 64 MiB and is the slowest to access. In some embodiments, L1 caches 320-322 are split into separate data and instruction caches.

Platform security processor 308 is a functional block that performs security-related operations in electronic device 300. For example, in some embodiments, platform security processor 308 includes a CPU core, an ASIC, and/or a microcontroller. Platform security processor 308 includes circuitry that is designed to be secure against specified malicious or erroneous behaviors of hardware and software entities in electronic device 300 (e.g., functional blocks and devices in processor 302, software entities executed by processor 302, etc.). Platform security processor 308 can therefore be used for securing the operations of other functional blocks, devices, and/or software entities that are susceptible to such behavior. In other words, Platform security processor 308 can perform operations associated with enabling a trusted execution environment in electronic device 300. To this end, platform security processor 308 may perform operations for encryption/decryption (e.g., key generation, encryption/decryption of data, etc.), registration and/or authentication of hardware and/or software entities, access permission verification, etc. In some embodiments, platform security processor 308 performs at least some of the operations described herein for protecting encrypted data stored in regions of memory associated with virtual machines. For example, platform security processor 308 may generate/allocate key IDs or otherwise assist with data encryption/decryption.

Fabric 310 is a functional block that performs operations for communicating data between other functional blocks in electronic device 300 via one or more communication channels. Fabric 310 includes wires/traces, transceivers, control circuitry, etc., that are used for communicating the data in accordance with a protocol or standard in use on fabric 310.

Memory controller 312 is a functional block that performs operations for interfacing between processor 302 and memory 304. Memory controller 312 performs operations such as synchronizing memory accesses, detecting and avoiding conflicts between memory accesses, etc. In some embodiments, among the operations performed by memory controller 312 are operations for encrypting and decrypting data stored in memory 304 for use by virtual machines and/or a hypervisor (e.g., virtual machines 100 and/or hypervisor 106). In addition, in some embodiments, memory controller 312 performs operations for storing ownership identifiers in metadata stored with encrypted data in memory 304 and using the ownership identifiers for determining whether encrypted data (following a decryption operation) or substitute data is to be provided to reading entities as part of operations for protecting encrypted data stored in the memory as described in more detail below.

Input-output controller 314 is a functional block that performs operations for interfacing between functional blocks and devices in electronic device 300 (e.g., processor 302, etc.) and input-output (IO) devices in and connected to electronic device 300. Generally, IO devices can include various functional blocks and devices, such as audio devices, displays, speakers, human interface devices, etc. Input-output controller 314 performs operations such as synchronizing IO device accesses, detecting and avoiding conflicts between IO device accesses, providing security for accesses of or by IO devices, etc. Note that, although input-output controller 314 may be connected to a number of IO devices in some embodiments, only mass storage 306 is shown in FIG. 3 for clarity and simplicity.

Although electronic device 300 is shown in FIG. 3 with a particular number and arrangement of functional blocks and devices, in some embodiments, electronic device 300 includes different numbers and/or arrangements of functional blocks and devices. For example, in some embodiments, electronic device 300 includes a different number of processors. In addition, although processor 302 is shown with a given number and arrangement of functional blocks, in some embodiments, processor 302 includes a different number and/or arrangement of functional blocks. For example, in some embodiments, processor 302 includes a different number of cores and/or a different number and/or arrangement of cache memories. Generally, in the described embodiments, electronic device 300 and processor 302 include sufficient numbers and/or arrangements of functional blocks to perform the operations herein described.

Electronic device 300 as shown in FIG. 3 is simplified for illustrative purposes. In some embodiments, however, electronic device 300 includes additional or different elements (i.e., functional blocks and devices) for performing the operations herein described and other operations. For example, electronic device 300 can include electrical power functional blocks or devices, networking functional blocks or devices, human interface functional blocks or devices (e.g., displays, touch sensitive input elements, speakers, etc.), input-output functional blocks or devices, etc.

Electronic device 300 can be, or can be included in, any electronic device that performs operations such as those described herein. For example, electronic device 300 can be, or can be included in, desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Controller Circuitry

Figure 4:
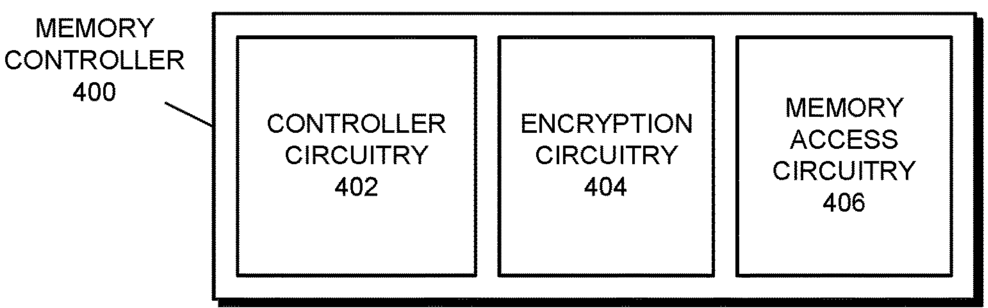
FIG. 4 presents a block diagram illustrating a memory controller in accordance with some embodiments.

In the described embodiments, controller circuitry in an electronic device performs operations for protecting encrypted data stored in a memory in the electronic device (e.g., memory 304 in electronic device 300) from possibly-malicious accesses by providing substitute data in response to read requests in specified situations. Depending on the embodiment, the controller circuitry or portions thereof can be found in various locations in the electronic device. For example, in some embodiments, the controller circuitry or portions thereof are located a processor, in a platform security processor, in the memory (e.g., in processor in memory circuitry), in an application specific integrated circuitry, in a microcontroller, etc. As another example, in some embodiments, the controller circuitry or a portion thereof is found in a memory controller. FIG. 4 presents a block diagram illustrating a memory controller 400 in accordance with some embodiments. Although memory controller 400 is presented with a particular arrangement and number of elements, in some embodiments, memory controller 400 includes a different number and/or arrangement of elements. Generally, in some embodiments, memory controller 400 includes sufficient elements arranged to perform the operations described herein—and other operations associated with handling memory accesses, etc. In addition, although the controller circuitry is described as being located in memory controller 400 as an example, in some embodiments, one or more different functional blocks or devices (e.g., a processor, a platform security processor, the memory, an ASIC, etc.) includes the controller circuitry or a respective portion thereof. In some embodiments, memory controller 312 is similarly organized, i.e., includes a similar arrangement of internal elements, to memory controller 400.

As can be seen in FIG. 4, memory controller 400 includes controller circuitry 402, encryption circuitry 404, and memory access circuitry 406. Controller circuitry 402 is a functional block that includes circuitry that controls and/or manages the operation of memory controller 400 and the functional blocks located therein. For example, in some embodiments, memory controller 400 can perform operations including initialization, processing memory access requests, handling interrupts, faults, and control communications, etc. In some embodiments, controller circuitry 402 performs operations for generating and storing ownership identifiers in metadata stored along with data in the memory as described herein. In addition, in some embodiments, controller circuitry 402 performs operations for acquiring and using the ownership identifiers for controlling whether encrypted data from the memory or substitute data is provided to requesting entities as described herein.

Encryption circuitry 404 is a functional block that performs operations for encrypting data to be stored in the memory and decrypting encrypted data retrieved from the memory to be provided to a reading entity (e.g., a virtual machine, the hypervisor, etc.). Encryption circuitry 404 encrypts/decrypts data in accordance with a specified encryption standard (e.g., Advanced Encryption Standard (AES), a block cipher, etc.). In some embodiments, in accordance with the encryption standard, encryption circuitry 404 uses encryption keys—or, more simply, "keys"—for performing encryption/decryption operations. In some embodiments, encryption circuitry 404 keeps and/or accesses a table of encryption key-identifier pairs or other record that encryption circuitry 404 uses to identify encryption keys to be used for encryption and decryption operations. In these embodiments, using a writing entity identifier (e.g., a key ID or other identifying value) from a write request or a reading entity identifier from a read request, encryption circuitry 404 looks up the appropriate encryption key in the table of encryption key-identifier pairs or other record (or otherwise computes or determines the encryption key). Encryption circuitry 404 then uses the encryption key to perform the encryption of data for a write request or the decryption of data for a read request.

Memory access circuitry 406 is a functional block that performs operations for accessing data in a memory. For example, memory access circuitry can generate and send memory access requests to the memory, handle responses to requests received from the memory, control a timing and/or rate at which memory access requests are sent to the memory, perform control operations for controlling the operation of the memory, etc.

Metadata

In the described embodiments, metadata is stored along with data in a memory (e.g., memory 304). Generally, the metadata includes information about, for, and otherwise associated with the respective stored data that can be used for various porpoises. For example, the metadata can include validity information, coherence information, error correction information, permissions information, time stamps/age information, data relationship information, etc. The metadata is "stored along with" the data in that the metadata is stored in memory circuitry having a given physical relationship to the memory circuitry in which the data is stored. For example, in some embodiments, the memory circuitry in which the metadata is stored is physically contiguous with the memory circuitry in which the data is stored (e.g., is part of a same row or portion of memory circuitry, etc.). In some embodiments, because the metadata is stored along with the data, the metadata can be stored in the memory along with the data in a single memory write operation and/or read from the memory along with the data during a single memory read operation. Continuing the example, the metadata can be read out of the memory circuitry by reading the data and the metadata into a row buffer (or other location), from where the metadata and the data are communicated to other functional blocks in the electronic device.

Figure 5:
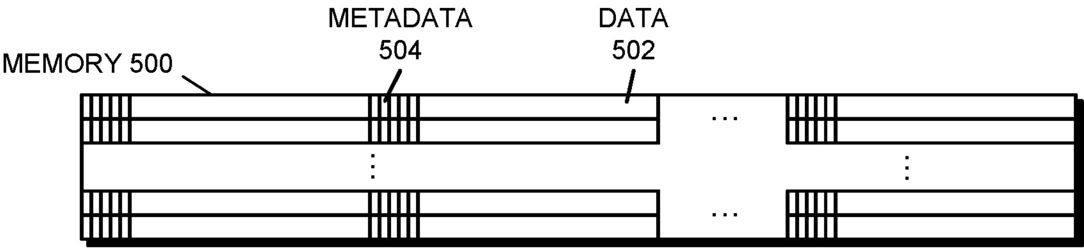
FIG. 5 presents a block diagram illustrating data and metadata in a memory in accordance with some embodiments.

FIG. 5 presents a block diagram illustrating data 502 and metadata 504 in a memory 500 in accordance with some embodiments. Although a particular number and arrangement of elements is shown in FIG. 5, in some embodiments, the elements are different and/or arranged differently. Generally, in the described embodiments, a memory stores data and metadata in an arrangement that enables the operations for protecting encrypted data in the memory using substitute data as described herein. In some embodiments, memory 304 or a portion thereof is arranged and organized similarly to memory 500.

Memory 500 includes an array of memory circuitry (e.g., DRAM memory circuitry, etc.) and associated access and control circuitry. The memory circuitry includes multiple data/metadata pairs, each pair including memory circuitry (e.g., bit cells, etc.) for storing C bytes of data 502 and D bytes of metadata 504 (for example, C=32, 64, or another number and D=2, 4, or another number). Each data/metadata pair is presented in FIG. 5 as a number of smaller rectangles in which metadata 504 is stored and a larger rectangle in which data 502 is stored (the data 502 and metadata 504 for only one data/metadata pair is labeled in FIG. 5 for clarity). Data 502 and metadata 504 are stored in the memory circuitry by writing the data 502 and the metadata 504 to the memory circuitry. Data 502 and/or metadata 504 are read from the memory circuitry by reading the data 502 and/or metadata 504 out of the memory circuitry. In some embodiments, the memory circuitry is arranged so that a given piece of data 502 and the associated metadata 504 are, or at least can be, written to and/or read out of the memory circuitry in a single write and/or read operation.

In some embodiments, metadata 504 includes one or more bits that are used for storing ownership identifiers that identify a type of writing entity that wrote data 502 to memory 500. As described herein, the ownership identifier is an identifier of one or more bits in length that identifies a type of writing entity that wrote data 502 to the memory from among a set of types of writing entities. For example, in some embodiments, the set of types of writing entities includes supporting virtual machines, legacy virtual machines, or the hypervisor. An ownership identifier will therefore be a value that identifies the writing entity as one of these—and/or as not being at least some of these (i.e., as not being a supporting virtual machine, etc.). In some embodiments, the writing entity is the entity that "owns" the data 502 or originally loaded/created the data 502 in the memory 500 and access to the data 502 is controlled (e.g., by a memory controller) on behalf of the owning entity. In some embodiments, all data in a region associated with an entity is owned by that entity—and thus will typically have a same ownership identifier. For example, in some embodiments, data stored in each page of memory loaded by a supporting virtual machine will have an ownership identifier that identifies the owner as a supporting virtual machine.

Figure 6:
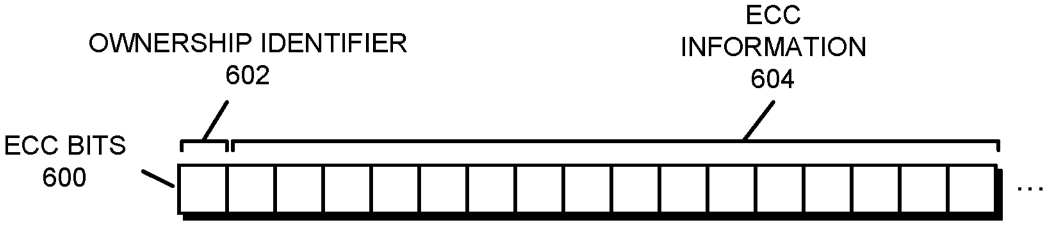
FIG. 6 presents a block diagram illustrating a set of error correction code (ECC) bits with an ownership identifier in accordance with some embodiments.

In some embodiments, metadata 504 is or includes a set of error correction code (ECC) bits. For example, in some embodiments, each set of ECC bits includes W bits (for example, W=16, 24, or another number). Each set of ECC bits is associated with a respective data 502. The ECC bits were originally intended to store ECC information for correcting errors in the respective data 502, but more efficient ECC schemes and/or other data protection schemes have rendered some or all of the ECC bits surplus—or unnecessary for a given level of error protection. In some embodiments, some or all of the surplus ECC bits are repurposed for storing ownership identifiers. That is, assuming that the ECC bit memory circuitry is included along with the memory circuitry during fabrication for storing each piece of data in the memory circuitry, the memory circuitry for storing one or more of the ECC bits is repurposed for storing the ownership identifier. FIG. 6 presents a block diagram illustrating a set of ECC bits 600 including an ownership identifier 602 in accordance with some embodiments. As can be seen in FIG. 6, ECC bits 600 includes a number of bits, each bit being represented by a square. ECC bits 600 store ownership identifier 602 in one bit and ECC information 604 in the remaining bits. Ownership identifier is or includes a bit that is set to identify the type of writing entity that stored the data in the memory. For example, in some embodiments, ownership identifier 602 is set to one (1) to identify the writing entity as a supporting virtual machine (i.e., to identify a type of the virtual machine that stored the data in the memory as a supporting virtual machine) and is set to zero (0) to identify that the writing entity is not a supporting virtual machine—i.e., is a legacy virtual machine or the hypervisor. Although one arrangement of bits and the information stored therein is presented in FIG. 6, in some embodiments, different arrangements of bits and/or information therein can be used. In addition, other types of writing entity, numbers of bits for storing the ownership identifier, and/or values of ownership identifier can be used in some embodiments.

Key Identifiers

In some embodiments, the reading entity identifiers from read requests and/or writing entity identifiers from write requests as described herein are key identifiers (IDs). Generally, a key ID is a value (e.g., a K bit value, for example, K=10, 16, or another number) that identifies a particular entity among a set of entities present in the electronic device. In some embodiments, the key ID also indicates—or can be used to determine or compute—whether a particular entity is a legacy virtual machine, supporting virtual machine, or the hypervisor. For example, in some embodiments, the key ID for each legacy or supporting virtual machine is dynamically selected for that virtual machine on startup, while the key ID for the hypervisor is/are one or more fixed or pre-assigned values. In these embodiments, the key IDs are dynamically selected for the virtual machines from among a set of key IDs that is divided into three subsets, with a first subset of the key IDs being used for the hypervisor, a second subset of the key IDs being used for supporting virtual machines, and a third subset of the key IDs being used for legacy virtual machines. For example, assuming that 1024 key IDs are supported by the electronic device, the hypervisor may be assigned key IDs 0-5, supporting virtual machines may be dynamically assigned key IDs from among keys 6-511 and legacy virtual machines may be dynamically assigned key IDs from among key IDs 512-1023.

In some embodiments, when generating an ownership identifier, e.g., as described below for step 704 of FIG. 7, the controller circuitry uses a value of the key ID to compute or determine the ownership identifier. For example, assuming that the above-described subsets for key IDs are in use, the controller circuitry can determine a subset in which a particular key ID (i.e., writing entity identifier) is located. In addition, when determining whether a reading entity is the hypervisor as described for step 1102 for FIG. 11, the described embodiments can determine whether the reading entity identifier is within a specified subset of key IDs used for the hypervisor.

Processes for Protecting Encrypted Data Stored in a Memory

Figure 9:
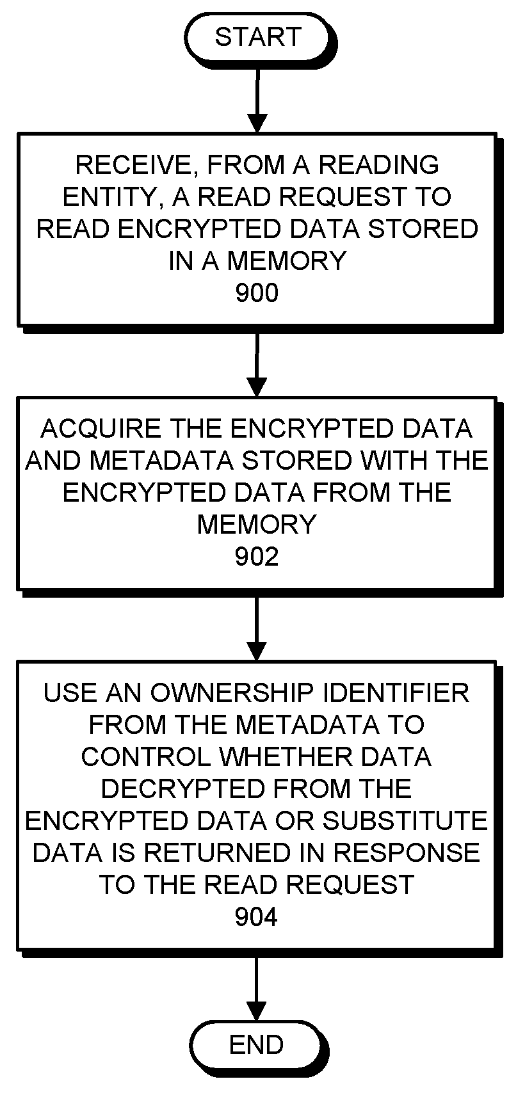
FIG. 9 presents a flowchart illustrating a process for using an ownership identifier from metadata stored with encrypted data in a memory to determine whether substitute data is returned in accordance with some embodiments.
Figure 11:
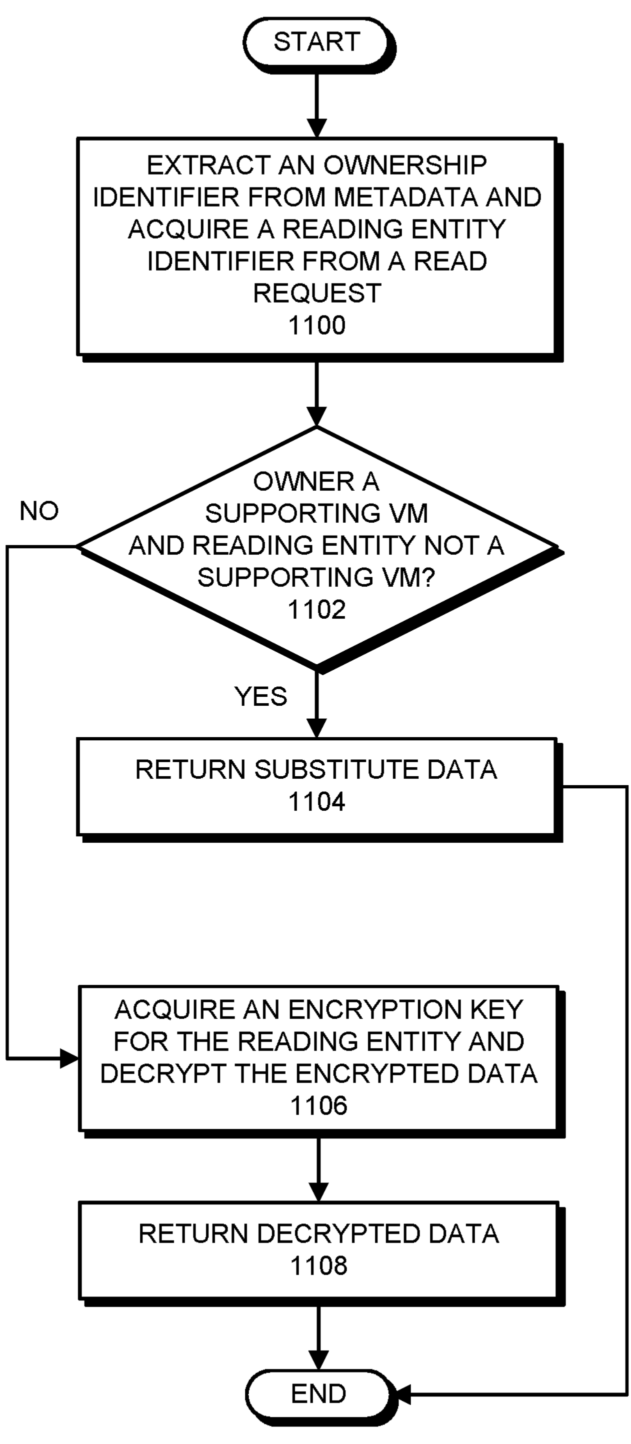
FIG. 11 presents a block diagram illustrating a process for using an ownership identifier to determine whether to return encrypted data or substitute data in accordance with some embodiments.

In the described embodiments, controller circuitry in an electronic device performs operations for using ownership identifiers in metadata stored along with encrypted data in a memory for protecting the encrypted data. FIGS. 7, 9, and 11 present flowcharts illustrating processes associated with the protection of encrypted data stored in a memory in accordance with some embodiments. More specifically, FIG. 7 presents a flowchart illustrating a process for storing encrypted data and an ownership identifier in metadata in a memory in accordance with some embodiments. FIG. 9 presents a flowchart illustrating a process for using an ownership identifier from metadata stored with encrypted data in a memory to determine whether substitute data is returned in accordance with some embodiments. FIG. 11 presents a block diagram illustrating a process for using an ownership identifier to determine whether to return encrypted data or substitute data in accordance with some embodiments. FIGS. 7, 9, and 11 are presented as general examples of operations performed in some embodiments. In other embodiments, however, different operations are performed and/or operations are performed in a different order. Additionally, although certain elements are used in describing the processes, in some embodiments, other elements perform the operations.

Figure 7:
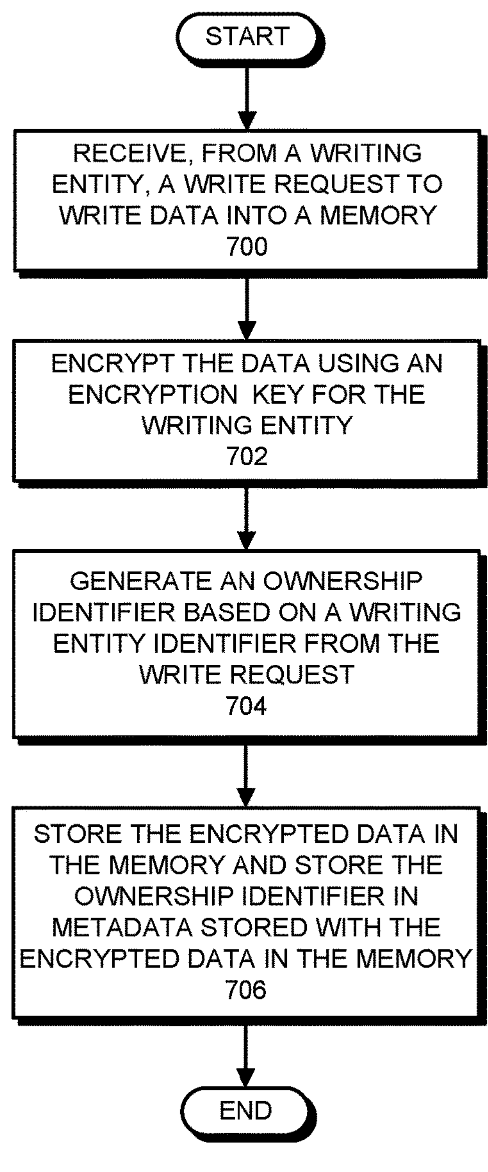
FIG. 7 presents a flowchart illustrating a process for storing encrypted data and an ownership identifier in metadata in a memory in accordance with some embodiments.

For the operation in FIG. 7, it is assumed that a writing entity writes a T byte chunk of data to a memory, i.e., writes a chunk of data that is T bytes in length following encryption (for example, T=32, 48, or another number). Generally, the T byte chunk of data is a chunk of data that is associated with its own metadata—and may be the smallest chunk of data that can be written to and/or read from the memory circuitry. Although a writing entity can write larger chunks of data to the memory in some embodiments, writing larger chunks includes writing multiple T byte chunks of data to the memory, each T byte chunk having its own metadata (e.g., writing T byte chunks to a number of different addresses/locations, each address/location having its own metadata). In this case, ownership identifiers are written to the metadata for each address/location to which a portion/T byte chunk of the encrypted data is written in a similar fashion to what is shown in FIG. 7.

Figure 8:
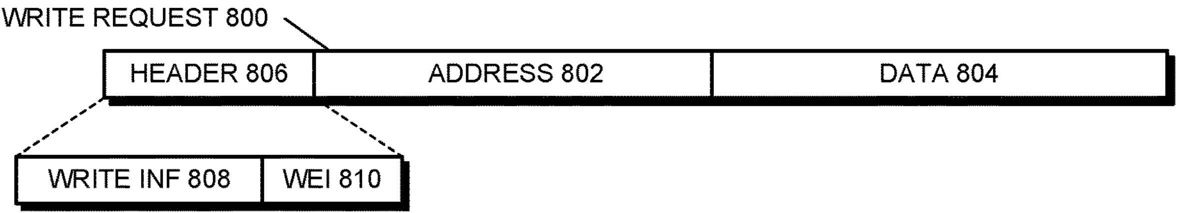
FIG. 8 presents a block diagram illustrating a write request in accordance with some embodiments.

The process in FIG. 7 starts when controller circuitry (e.g., controller circuitry 402) receives, from a writing entity, a write request to write data into memory (step 700). For this operation, the controller circuitry receives the write request from the writing entity itself or from another source (e.g., a packet or data stream including the write request, etc.)—or receives information based on or extracted from the write request. FIG. 8 presents a block diagram illustrating a write request 800 in accordance with some embodiments. As can be seen in FIG. 8, write request 800 includes address 802, which is an address in memory where the data is to be written/stored (e.g., a virtual address to be translated to a physical address, a physical address, etc.). Write request 800 also includes data 804, which is the data to be written to the memory. Write request 800 further includes header 806, which is a portion of the write request in which information about, for, and/or used for processing the write request is included. An expanded view of header 806 is provided below header 806 and includes write information (WRITE INF) 808 and writing entity identifier 810. Write information 808 includes information about write request 800, such as a size of the data, a type of the data, permissions information, control information, communication information, etc. Writing entity identifier 810 includes information identifying the writing entity, such as a W bit key ID or other identifier that identifies the writing entity among a set of entities present in the electronic device (for example, W=10, 14, or another number). Although FIG. 8 is presented as an example, in some embodiments, write requests include different information and/or a different arrangement of information. Generally, write requests include sufficient information to perform the operations described herein.

Encryption circuitry (e.g., encryption circuitry 304) then encrypts the data using an encryption key for the writing entity (step 702). For this operation, the encryption circuitry acquires an encryption key from a table of encryption key-identifier pairs or other record using a writing entity identifier from the write request and possibly other information, such as a public/private specification for the data from the write request or elsewhere. In other words, the encryption circuitry selects, from among a set of encryption keys in use in the electronic device, a particular encryption key to be used for encrypting the data. In some embodiments, when the data is private to the writing entity (and thus not to be accessible to other entities such as virtual machines and/or the hypervisor), the encryption circuitry selects the writing entity's encryption key for its private data—and otherwise selects the writing entity's encryption key for its public data. The encryption circuitry then decrypts the data in accordance with an encryption standard in use in the electronic device (e.g., AES, etc.) using the acquired encryption key.

The controller circuitry next generates an ownership identifier based on the writing entity identifier from the write request (step 704). For this operation, the controller circuitry uses the writing entity identifier to lookup, acquire, compute, or otherwise create an ownership identifier that identifies the writing entity as one of: a supporting virtual machine, a legacy virtual machine, or the hypervisor. For example, the controller circuitry can look the ownership identifier up in a lookup table that relates writing entity identifiers to ownership identifiers. As another example, the controller circuitry can compute the ownership identifier based on a value of the writing entity identifier, such as by determining a range of writing entity identifiers into which the particular writing entity identifier falls from among a multiple predetermined ranges of writing entity identifiers.

Recall that a supporting virtual machine supports the provision of substitute data as described herein, while a legacy virtual machine does not support the provision of substitute data (note that legacy virtual machines may not support one or more other features from one or more other feature sets, although such features are not addressed here for clarity and brevity). In some embodiments, for this operation, the controller circuitry generates a one bit value that identifies the writing entity as either: (0) a supporting virtual machine or (1) a legacy virtual machine or the hypervisor.

Memory access circuitry (e.g., memory access circuitry 306) then stores the encrypted data in the memory and stores the ownership identifier in metadata stored with the encrypted data in the memory (step 706). For this operation, the memory access circuitry prepares a packet or other communication to request the memory to store the encrypted data at an address in memory indicated by the write request and also store the ownership identifier (and possibly other metadata) in metadata at/associated with the address in memory. In some embodiments, the packet or other communication is configured to cause the memory to store both the encrypted data and the ownership identifier (and possibly the other metadata) in the memory in a single write operation. After this operation is complete, the data is stored at an address/location in memory and the ownership identifier (and possibly other metadata) is stored in metadata that is stored along with the encrypted data in the memory. Using FIG. 5 as an example, the ownership identifier (and possibly the other metadata) is stored in metadata 504.

In some embodiments, metadata in the memory includes error correction code (ECC) bits and the ownership identifier is stored in the ECC bits in the metadata. For example, in some embodiments, the metadata includes ECC bits such as shown in FIG. 6 and the ownership identifier is stored in the ECC bits similarly to ownership identifier 602—and ECC information 604 may be stored in the other ECC bits. In some of these embodiments, the ECC bits are "repurposed" for storing the ownership identifier. That is, instead of being used for storing ECC information, as the ECC bits were originally intended, at least some ECC bits are used for storing the ownership identifier. Although the repurposing of the ECC bits for storing the ownership identifier reduces the number of ECC bits available for storing ECC information, the remaining ECC bits can store sufficient ECC information for detecting and/or correcting at least some bit errors—or a different error correcting scheme can be in use.

Proceeding now to FIGS. 9 and 11, which are directed to a read of encrypted data stored in the memory, for the operations in these figures, it is assumed that encrypted data is stored in a memory and an ownership identifier is stored in metadata that is stored along with the encrypted data in the memory. For example, in some embodiments, the operations of FIG. 7 were previously performed to store the encrypted data and the metadata with the ownership identifier in the memory. In addition, it is assumed that the read is for a T byte chunk of data, and thus is for a chunk of data that has its own metadata in the memory—and may be the smallest chunk of data that can be written to and/or read from the memory circuitry. Although a reading entity can read larger chunks of data from the memory in some embodiments, larger reads can include separately reading multiple T byte chunks of data from the memory, each T byte chunk having its own metadata (e.g., reading T byte chunks from a number of different addresses/locations, each address/location having its own metadata). In this case, ownership identifiers are read from the metadata for each address/location from which a portion/T byte chunk of the encrypted data is read in a similar fashion to what is shown in FIGS. 9 and 11.

For the process in FIG. 9, it is assumed that other schemes used by the electronic device for protecting data in memory do not cause the read request to be blocked or otherwise prevent the read request from being performed. For example, assume an embodiment in which the above-described access record is used for protecting the private data of supporting virtual machines. In this case, when the reading entity is a supporting virtual machine, the access record is checked to ensure that the supporting virtual machine is permitted to access the encrypted data (which may belong to the supporting virtual machine itself or to another entity). In this case, it is assumed that the supporting virtual machine is permitted to access the encrypted data stored in the memory. Otherwise, if the supporting virtual machine was not permitted to access the encrypted data stored in the memory, the read request would be blocked and at least some of the operations of FIGS. 9-10 would not be performed.

Figure 10:
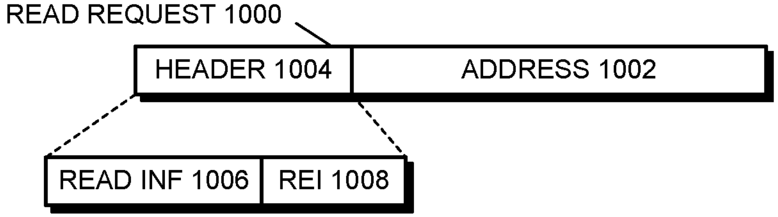
FIG. 10 presents a block diagram illustrating a read request in accordance with some embodiments.

The process in FIG. 9 starts when controller circuitry receives, from a reading entity, a read request to read encrypted data stored in the memory (step 900). For this operation, the controller circuitry receives, from the reading entity itself or another source, the read request (e.g., a packet or data stream including the read request, etc.)—or information based on or extracted from the read request. FIG. 10 presents a block diagram illustrating a read request 1000 in accordance with some embodiments. As can be seen in FIG. 10, read request 1000 includes address 1002, which is an address in memory from where the data is to be read/loaded (e.g., a virtual address to be translated to a physical address, a physical address, etc.). Read request 1000 also includes header 1004, which is a portion of the read request in which information about, for, and/or used for processing the read request is included. An expanded view of header 1004 is provided below header 1004 and includes read information (READ INF) 1006 and reading entity identifier (REI) 1008. Read information 1006 includes information about read request 1000, such as a size of the data, a type of the data, permissions information, control information, communication information, etc. Read entity identifier 1008 includes information about the reading entity, such as a key ID or other identifier that identifies the reading entity. Although FIG. 10 is presented as an example, in some embodiments, read requests include different information and/or a different arrangement of information.

Memory access circuitry (e.g., memory access circuitry 306) then acquires the encrypted data and metadata stored with the encrypted data from the memory (step 902). For this operation, the memory access circuitry prepares a packet or other communication to request that the memory to read out and return the encrypted data and the metadata from an address in memory indicated by the read request. In some embodiments, the packet or other communication is configured to cause the memory to read both the encrypted data and the ownership identifier from the memory in a single read operation. Responsive to receiving the request, the memory reads out and returns the encrypted data and the metadata to the memory access circuitry.

The control circuitry then uses an ownership identifier to control whether data decrypted from the encrypted data or substitute data is returned to the reading entity in response to the read request (step 904). For this operation, the memory access circuitry forwards the metadata received from the memory to the controller circuitry which extracts the ownership identifier from the metadata. The controller circuitry also acquires the reading entity identifier from the read request. The controller circuitry then uses the ownership identifier and the reading entity identifier to control whether data decrypted from the encrypted data or substitute data is returned as shown in FIG. 11.

The process in FIG. 11 starts with the controller circuitry extracts the ownership identifier from the metadata and acquires a reading entity from the read request as described above (step 1100). The controller circuitry then determines whether (or not) a condition is met for returning the substitute data instead of data decrypted from the encrypted data to the reading entity in response to the read request. For this operation, the controller circuitry determines whether an owner indicated by the ownership identifier is a supporting virtual machine (VM) and a reading entity indicated by the reading entity identifier is not a supporting virtual machine (step 1102). In other words, the controller circuitry determines if the reading entity is the hypervisor or a legacy virtual machine, i.e., is a reading entity other than a supporting virtual machine. When this combination of ownership identifier and reading entity identifier is found, the condition is considered to be true (i.e., met, satisfied, etc.). That is, the hypervisor or a legacy virtual machine, which may be maliciously accessing/reading the encrypted data as described above, is attempting to read the encrypted data for a supporting virtual machine (i.e., a virtual machine that supports the return of substitute data, in contrast to a legacy virtual machine). When the ownership identifier indicates that the owner of the encrypted data is a supporting virtual machine and the reading entity is not a supporting virtual machine (step 1102), the controller circuitry returns the substitute data instead of returning the encrypted data (step 1104). In other words, the controller circuitry returns substitute data having a specified pattern to the hypervisor or legacy virtual machine (i.e., the reading entity) in order to avoid providing the encrypted data (or data decrypted therefrom) to the hypervisor or the legacy virtual machine. For example, the controller circuitry can return substitute data with a number of bits having all logical one or zero values, a predetermined mixture or pattern of zero and one values, a random mixture of zero and one values, etc. In some embodiments, the substitute data is always the same value, but in other embodiments, the substitute data is a different value each time (or each number of times) that the substitute data is returned. In some embodiments, the substitute data is arranged to deceive the hypervisor or the legacy virtual machine, such as by changing the substitute value each time that the substitute value is returned, making the substitute data appear like "real" data, etc.

In contrast to the above, when the controller circuitry determines that the condition is not met, i.e., is considered to be false, the controller circuitry returns the encrypted data following a decryption operation. In other words, when: (1) a reading entity other than the hypervisor or a legacy virtual machine reads encrypted data for a supporting virtual machine or (2) any type of reading entity reads a hypervisor or a legacy virtual machine's encrypted data, returning the encrypted data following a decryption operation is considered safe—and/or is the form of operation expected by/permitted by the reading entity. The controller circuitry therefore returns the encrypted data following a decryption operation. For this operation, the encryption circuitry acquires an encryption key for the reading entity and decrypts the encrypted data (step 1106). More specifically, the encryption circuitry acquires an encryption key from a table of encryption key-identifier pairs using a reading entity identifier from the read request and possibly other information, such as a public/private specification for the data from the read request or elsewhere. In other words, the encryption circuitry selects, from among a set of encryption keys in use in the electronic device, a particular encryption key to be used for decrypting the data. In some embodiments, when the data is considered private to the reading entity, the encryption circuitry selects the reading entity's encryption key for its private data—and otherwise selects the reading entity's encryption key for public data. The encryption circuitry then decrypts the data in accordance with an encryption standard in use in the electronic device (e.g., AES, etc.) using the acquired encryption key. The controller circuitry then returns the decrypted data to the reading entity (step 1108).

In some cases, the decrypted data returned by the controller circuitry may be unreadable to the reading entity. This is true because the encrypted data is first decrypted by encryption circuitry before being returned by the controller circuitry—and may be decrypted with an encryption key different than the encryption key that was originally used to encrypt the data (it is assumed for this description that the same encryption key is used for encryption and decryption). For example, assume that data was stored in the memory by a given legacy virtual machine (i.e., a virtual machine that does not support the return of the substitute data) and is being read by the hypervisor. In this case, for decrypting the encrypted data, the controller circuitry passes the encrypted data to the encryption circuitry, which acquires an encryption key associated with the hypervisor/the reading entity and uses the acquired encryption key to decrypt the encrypted data. Because the hypervisor is not the entity that wrote the data in the memory, the encryption key used to decrypt the data will not be the correct key and will therefore result in unreadable data (i.e., improperly decrypted and typically undecipherable data). The encryption circuitry then returns the unreadable data to the controller circuitry, which responds to the hypervisor with the unreadable data.

Protecting Encrypted Data for Other Types of Entities

Figure 12:
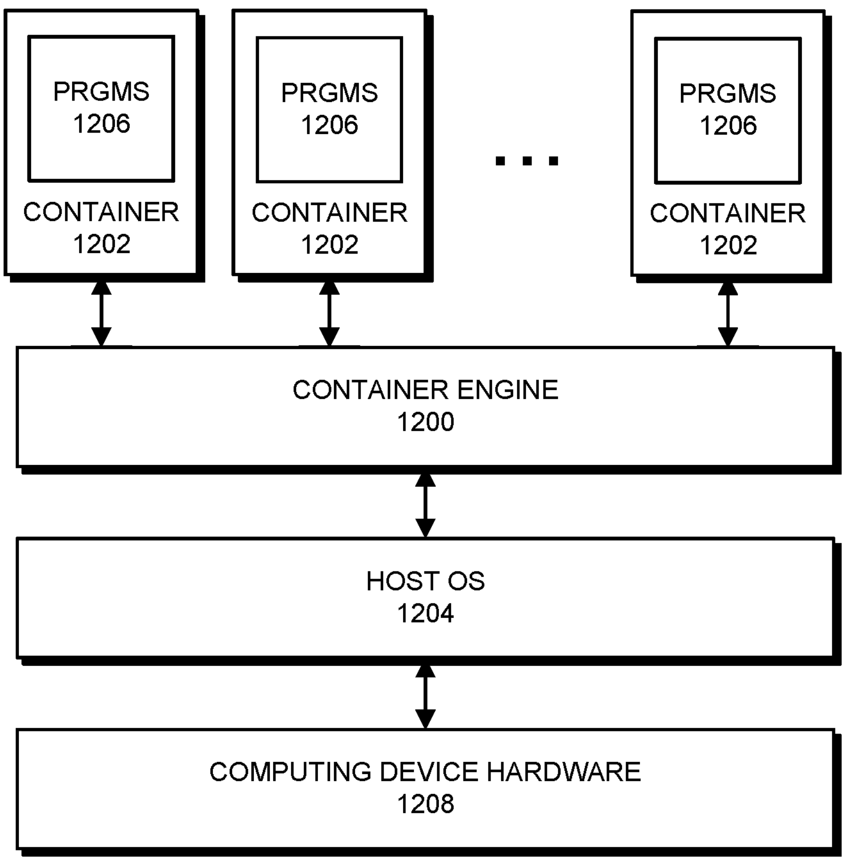
FIG. 12 presents a block diagram illustrating containers in accordance with some embodiments.

Although virtual machines are used for describing operations of controller circuitry for protecting encrypted data stored in regions of memory, in some embodiments, encrypted data for different or additional software (or hardware) entities is protected using similar operations. For example, in some embodiments, encrypted data in regions of memory associated with containers are protected using similar operations. Generally, containers and/or a container engine that manages the containers are software entities that perform virtualization functions for enabling programs to share computing device hardware. Containers, however, are lighter "weight" than virtual machines in terms of the number of separate software components associated with containers. This is true because containers share host operating system components and possibly application binaries and libraries instead of using separate copies of these software components themselves—in contrast to virtual machines that implement separate copies of these software components. FIG. 12 presents a block diagram illustrating containers in accordance with some embodiments. As can be seen in FIG. 12, instead of a hypervisor and separate operating system instances (e.g., hypervisor 106 and operating systems 102) as in the examples above, a container engine 1200 interfaces between containers 1202 and host operating system (OS) 1204. The containers 1202 share a kernel of host operating system 1204 and may also share binaries and libraries (not shown) used by programs 1206 (the kernel and the shared binaries and libraries are typically read only for the containers 1206). Each container provides an environment for executing programs 1206 such as databases, applications, etc. Host operating system 1204 provides an interface between electronic device hardware 1208 and the containers 1206. Although various elements are presented in FIG. 12, in some embodiments, different arrangements of elements are present. For example, an IOMMU and IO device hardware (e.g., IOMMU 112 and IO device hardware 114) are present in some embodiments.

In an embodiment in which containers are used, each of the containers can be associated with a region of a memory in the electronic device for the use of that container. For example, a region can include or consist of a set of M KiB contiguous or non-contiguous pages of memory that are loaded by a given container from a mass storage device into the memory or newly created in the memory (for example, M=4, 8, or another number). In these embodiments, the data stored in each container's region of memory can be private or public—and can be encrypted similarly to how data is encrypted for virtual machines as described above. Accesses of encrypted data are protected from impermissible accesses by other containers (and/or the programs executed thereon) using ownership identifiers in memory (e.g., ownership identifier 602). For example, when a given container stores data in the given container's region of memory, encryption circuitry can encrypt the data (e.g., similarly to what is described for step 702) and controller circuitry can generate an ownership identifier for the encrypted data that identifies the given container to whom the data belongs (e.g., similarly to what is described for step 704). Memory access circuitry can then store the encrypted data in memory and store the ownership identifier in metadata stored along with encrypted data in the memory (similarly to what is described for step 706). The control circuitry then uses the ownership identifier stored with the encrypted data to control whether data decrypted from the encrypted data or substitute data is returned to a reading container and/or other entity in response to a read request (similarly to what is described for FIGS. 9 and 11). Note, however, that embodiments in which data for containers is protected (and not virtual machines) differ from what is shown in FIG. 11 in that the rules for access in step 1102 are different and apply to containers and the other entities in the container system. For example, it may be that particular containers, the container engine, or the host operating system are prevented from accessing data—and thus will be returned the substitute data. Generally, in these embodiments, ownership identifiers stored in memory (e.g., in metadata such as repurposed ECC bits or other locations) are used for protecting encrypted data for containers from impermissible accesses by other entities.

In some embodiments, at least one electronic device (e.g., electronic device 200, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 200 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments, despite appearing in the list.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:

a memory; and controller circuitry, the controller circuitry being configured to:

acquire, from metadata stored with encrypted data in the memory, an ownership identifier;

return data decrypted from the encrypted data, responsive to a first read request for the encrypted data, based on the ownership identifier; and return substitute data instead of the encrypted data, responsive to a second read request for the encrypted data, based on the ownership identifier, the substitute data including a specified pattern of bit values.

2. The electronic device of claim 1, wherein the controller circuitry is configured to return the substitute data when:

the ownership identifier indicates that a writing entity that stored the encrypted data in the memory is a supporting virtual machine; and a reading entity identifier associated with the second read request indicates that a reading entity is not a supporting virtual machine.

3. The electronic device of claim 2, wherein:

the ownership identifier and the reading entity identifier are, or are generated from, key identifiers (IDs) from among a set of key IDs; and the set of key IDs includes one or more key IDs allocated to a hypervisor, a first subset of key IDs to be allocated to supporting virtual machines, and a second subset of key IDs to be allocated to legacy virtual machines, the first subset being separate from the second subset.

4. The electronic device of claim 1, wherein the ownership identifier indicates that a writing entity that stored the encrypted data and a reading entity associated with the first read request are each one of:

a legacy virtual machine that does not support the controller circuitry returning the substitute data;

a supporting virtual machine that supports the controller circuitry returning the substitute data; or a hypervisor.

5. The electronic device of claim 1, further comprising encryption circuitry configured to, when data decrypted from the encrypted data is returned responsive to the first read request:

acquire, based on the first read request, a decryption key associated with a reading entity; and perform a decryption operation to decrypt the encrypted data using the decryption key, wherein the decryption operation:

results in properly decrypted data when the reading entity is an entity that stored the encrypted data in the memory or is permitted to access the encrypted data; and results in improperly decrypted data when an entity other than the reading entity stored the encrypted data in the memory or is not permitted to access the encrypted data.

6. The electronic device of claim 1, further comprising encryption circuitry, wherein:

the encryption circuitry is configured to encrypt data using an encryption key associated with a writing entity, the encryption key being acquired based on a write request to store the data in the memory;

the controller circuitry is configured to generate, based on a writing entity identifier from the write request, the ownership identifier to identify a type of the writing entity; and the controller circuitry is configured to store the encrypted data in the memory and the ownership identifier in the metadata stored with the encrypted data in the memory.

7. The electronic device of claim 1, wherein the ownership identifier identifies a type of a writing entity that stored the encrypted data in the memory, the type of the writing entity being one of a hypervisor, a legacy virtual machine, and a supporting guest virtual machine.

8. The electronic device of claim 1, wherein the metadata includes a plurality of error correction code (ECC) bits and at least some of the plurality of ECC bits are repurposed for storing the ownership identifier.

9. A method for handling data in an electronic device, the method comprising:

acquiring, from metadata stored with encrypted data in a memory, an ownership identifier;

returning data decrypted from the encrypted data, responsive to a first read request for the encrypted data, based on the ownership identifier; and returning substitute data instead of the encrypted data, responsive to a second read request for the encrypted data, based on the ownership identifier, the substitute data including a specified pattern of bit values.

10. The method of claim 9, wherein the ownership identifier indicates that a writing entity that stored the encrypted data in the memory is a supporting virtual machine and a reading entity identifier associated with the second read request indicates that a reading entity is not a supporting virtual machine.

11. The method of claim 10, wherein:

the ownership identifier and the reading entity identifier are, or are generated from, key identifiers (IDs) from among a set of key IDs; and the set of key IDs includes one or more key IDs allocated to a hypervisor, a first subset of key IDs to be allocated to supporting virtual machines, and a second subset of key IDs to be allocated to legacy virtual machines, the first subset being separate from the second subset.

12. The method of claim 9, wherein the ownership identifier indicates that a writing entity that stored the encrypted data and a reading entity associated with the first read request are each one of:

a legacy virtual machine that does not support returning the substitute data;

a supporting virtual machine that supports returning the substitute data; or a hypervisor.

13. The method of claim 9, further comprising, for returning the data decrypted from the encrypted data:

acquiring, based on the first read request, a decryption key associated with a reading entity associated with the first read request; and decrypting the encrypted data using the decryption key, which:

results in properly decrypted data when the reading entity is an entity that stored the encrypted data in the memory or is permitted to access the encrypted data; and results in improperly decrypted data when an entity other than the reading entity stored the encrypted data in the memory or is not permitted to access the encrypted data.

14. The method of claim 9, further comprising:

encrypting data using an encryption key associated with a writing entity, the encryption key being acquired based on a write request to store the data in the memory;

generating, based on a writing entity identifier from the write request, the ownership identifier to identify a type of the writing entity; and storing the encrypted data in the memory and the ownership identifier in the metadata stored with the encrypted data in the memory.

15. The method of claim 9, wherein the ownership identifier identifies a type of a writing entity that stored the encrypted data in the memory, the type of the writing entity being one of a hypervisor, a legacy virtual machine, or a supporting guest virtual machine.

16. The method of claim 9, wherein the metadata includes a plurality of error correction code (ECC) bits and at least some of the plurality of ECC bits are repurposed for storing the ownership identifier.

17. The method of claim 9, wherein the substitute data comprises a specified pattern of bit values that each have a logical one value.

18. The method of claim 9, wherein the substitute data comprises a specified pattern of bit values that each have a logical zero value.

19. The method of claim 9, wherein the substitute data comprises a specified pattern of bit values comprising a mixture of zero values and one values.

20. A non-transitory computer-readable storage medium storing instructions that are executable by at least one processing device to:

acquire, from metadata stored with encrypted data in a memory, an ownership identifier;

return data decrypted from the encrypted data, responsive to a first read request for the encrypted data, based on the ownership identifier; and return substitute data instead of the encrypted data, responsive to a second read request for the encrypted data, based on the ownership identifier, the substitute data including a specified pattern of bit values.

* * * * *